Figure 1:
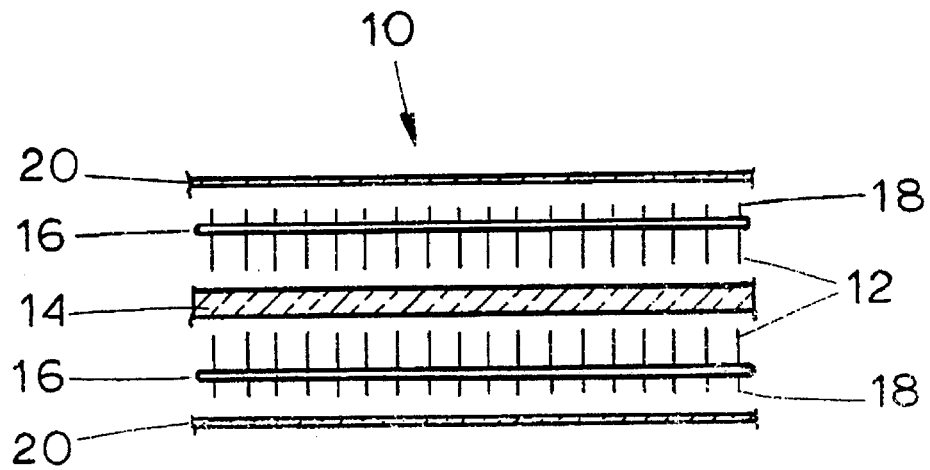

United States Patent [19]

Jansz et al.

[11] Patent Number: 5,580,646

[45] Date of Patent: Dec. 3, 1996

[54] FIBRE REINFORCED THERMOPLASTIC SHEET

[75] Inventors: Just J. C. Jansz, Ammerswil, Switzerland; Joachim Sengbusch, Eggingen, Germany

[73] Assignee: Symalit AG, Lenzburg, Switzerland

[21] Appl. No.: 310,697

[22] Filed: Sep. 22, 1994

[30] Foreign Application Priority Data

Sep. 25, 1993 [EP] European Pat. Off. .............. 93115500

[51] Int. Cl.$^6$ .................................................. B32B 15/00
[52] U.S. Cl. ........................ 428/228; 428/236; 428/300; 428/301; 428/221; 428/280; 428/284; 428/290
[58] Field of Search ..................................... 428/228, 236, 428/300, 246, 301, 221, 280, 284, 290

[56] References Cited

U.S. PATENT DOCUMENTS 4,335,176   6/1982   Baumann .................. 428/228

Primary Examiner—Newton Edwards
Assistant Examiner—Rich Weisberger
Attorney, Agent, or Firm—Marshall, O'Toole, Gerstein, Murray & Borun

[57] ABSTRACT

A glass mat reinforced thermoplastic semi-finished sheet material comprising thermoplastic resin and at least two needled continuous and/or chopped glass fibre strand mats is disclosed as well as a method for its manufacturing and its use. Each of said glass mats is needled from the two sides in an asymmetrical way, so that the number of fibre ends protruding from the two major mat surfaces are practically the same, but the length of said fibre ends protruding from the first major surface is substantially longer than the length of the fibre ends protruding from the second opposite major surface. Said glass mats are impregnated with thermoplastic resin, having either their first major surfaces directed towards the outside surface of said thermoplastic sheet, for maximum mouldability, or having their second major surfaces directed towards the outside surface of said thermoplastic sheet, for maximum surface quality of the moulded part.

6 Claims, 1 Drawing Sheet

FIBRE REINFORCED THERMOPLASTIC SHEET

The invention relates to fibre reinforced sheet thermoplastic composites, in particular to glass mat reinforced thermoplastic semi-finished sheet material (GMT). These thermoplastic composite materials are increasingly replacing steel and thermoset resin based composites in a wide range of applications, such as automotive parts. Typical examples are noise shields, battery trays, seat structures, bumper beams, dashboard supports and front end panels.

Processing of the semi-finished sheet material to finished parts is done by hot flow moulding ("stamping") whereby the material is first subjected to heat and then to pressure. Pre-cut blanks are generally pre-heated to well above the melting point of the thermoplastic resin. Shaping is done in a cold mould using a fast closing press in order to press the material into the extremities of the mould cavity.

Complex shapes, including deep thin ribs, undercuts etc. can be realized, but require a good balance between the mobility of the glass mat and the flowability of the thermoplastic resin.

Glass mats are typically prepared by mechanical bonding of endless and/or chopped glass fibre strands in a needling machine, but staple fibres can also be used. Needling comprises puncturing the continuous and/or chopped glass fibre strands with a large number of barbed needles in order to mechanically bond the glass fibre strands and bring about a certain level of integrity, which allows the glass mats to be handled for further processing. At the same time, the glass fibre strand will be partly split into single filaments and a part of the glass fibre strands is broken. This allows the needling process to be tailored to control the average glass fibre length and the glass mat mobility.

The properties of the glass mats are important to the performance of the semi-finished composite sheet made thereof, in particular to the flowability of the semi-finished composite sheet and the surface aspect of the finished part with respect to the visibility of the glass fibres on the surface of the moulded part. The fibre ends protruding from the two major surfaces of each glass fibre strand mat are recognized to be a significant factor influencing the properties of the glass mat.

Such fibre ends protruding from the surface of the glass fibre strand mats are often referred to as "spikes". In general, the number of spikes on the surface of the glass mat can be increased by adjusting the puncturing frequency and/or the glass mat line speed to increase the number of punctures per unit of surface area. The number of spikes on the surface of the glass mat can also be increased by using needles with an increased number of barbs or by barbs of a different shape. However, the amount of fibre breakage also depends on other factors, such as the flexibility of the single filaments and the type of coating on the glass fibre strands.

Needled glass fibre strand mats can be made by puncturing from one side or from two sides. In the latter case, a double-sided needling machine can be used, or the glass mats can be fed twice through a single-sided needling machine. If glass mats are made by needling from one side, as described e.g. in GB 20888282, one side of the glass mat will be relatively smooth, i.e. will contain only a low density of spikes, whereas the other side will contain a significantly higher density of spikes. When puncturing from top to bottom, the glass mat surface containing the high number of spikes will be the bottom side of the glass mat when needles with conventional barbs are use, or the top side of said glass mat when reverse barb needles are used.

By applying single sided needling, reasonably good flowability and glass mat mobility, as well as sufficient disintegration of the glass fibre strands into single fibre filaments over the full thickness of the glass mat can be achieved by carefully optimizing needling parameters, but a high puncturing depth must typically be chosen. As a consequence, the glass fibre ends protruding from one side of the glass mat will be very long, in particular at a high specific surface weight of the glass mat. This gives satisfactory results for a large number of applications, but allows only impregnation of said glass mats with the "long spikes surface" sides oriented towards the outside surface of the semi-finished composite sheet (GB 20888282), since non-symmetrically laminated semi-finished sheet material has the tendency to delaminate when heated, due to the separating forces of the long spikes directed inside.

Both long spikes surfaces oriented towards the outside surface of the semi-finished composite sheet, however, has the disadvantage that both surfaces are of rough appearance due to the long spikes.

Furthermore, by one-side needling it is not possible to produce a glass mat with a homogeneous mat structure and filament disintegration, as well as short spikes.

An additional degree of freedom is obtained and more homogeneous glass fibre strand mats can be made by needling from both sides. The obvious method of using symmetrically needled glass mats is described e.g. in EP 0319832. Symmetrically needled glass fibre strand mats have the important disadvantage that the length of the spikes on both major surfaces of the mats cannot be controlled independently, so that again the flexibility to meet special product requirements and the control of the properties of the semi-finished composite sheet and the moulded part made thereof is limited.

For example if better flowability is desired, the tendency to delaminate will also be enhanced.

It is therefore a subject of the present invention to provide fibre reinforced semi-finished thermoplastic sheet materials with controlled properties due to a tailored control of the number and length of the fibre ends protruding from both major surfaces of each glass mat.

This subject is met by using as reinforcing elements asymmetrical double-side needled glass fibre mats.

The major advantage of using double-side needled, asymmetrical glass mats, compared to single-side needled mats, is that a more homogeneous glass mat in terms of mat structure and disintegration of strands into single filaments can be made, with significantly increased freedom and full control over the number and length of the spikes on each side of the mat.

The major advantage of using double-side needled, asymmetrical glass mats, compared to double-side needled, symmetrical mats, is that the length of the spikes on the glass mat surface can be controlled independently for each side of the glass mats, while maintaining essentially the same spikes density on both sides of the glass mats. The length of the spikes and the spikes density can be chosen in such a way that impregnation of said glass mats can be done according to two different configurations as shown by the figures.

The figures show two different laminate build-ups. The main requirement is that the build up should be symmetrical to avoid processing difficulties, in particular non-isotropic flow behavior and warpage of laminate blanks.

Advantages of the two possible symmetrical arrangements depend on the requirements of a specific application and may also have an influence on the selection of the best processing line (pre-heating facility)

FIG. 1 shows a semi-finished material (10) according to the invention with the "long spikes surface" (12) sides oriented towards a layer of thermoplastic resin (14) located on the inside of the semi-finished composite sheet made of said glass mats (16). Shorter spikes (18) on the outside provide resin rich surfaces (20) in the blank load area of the moulded part, giving improved surface aspect. Short spikes on one side of a glass mat can be realized by applying low puncturing depth or by using needles with adjusted barb location for one of the needling sides. One novel feature of the invention is that overall needling requirements for realizing optimum glass mat properties in terms of mat integrity, controlled fibre breakage, glass mat mobility and compressibility, are typically compensated by applying a higher puncturing depth on the other side of the glass mat, thus creating longer spikes on that side of the glass mat.

Since the fibre mat is double-sided needled, the length of the long spikes is still smaller than those of a single-sided needled mat with about the same features, i.e. flowability.

Therefore a semi-finished composite sheet according to the present invention has lower tendency to delaminate when heated than a single-sided needled product of the same build-up.

It is especially suited for pre-heating in an infra-red oven.

This arrangement with short/short outwards oriented spikes provides for an improved surface aspect of the moulded part. This property is difficult to quantify, but plays a decisive role for a growing category of applications. The logic behind it is that this method allows fine tuning to optimize the glass mat structure to have very short spikes (say ca. 1 mm) on the heated blank surface, without having to compromise e.g. on the needling intensity of the mat. Short spikes on the heated blank surface contribute to preventing the presence of visible glass fibers on the moulded part surface.

Such semi-finished material is especially suited for automotive interior trim parts and semi-structural parts, which require high quality almost fibre free surfaces.

Figure 2:
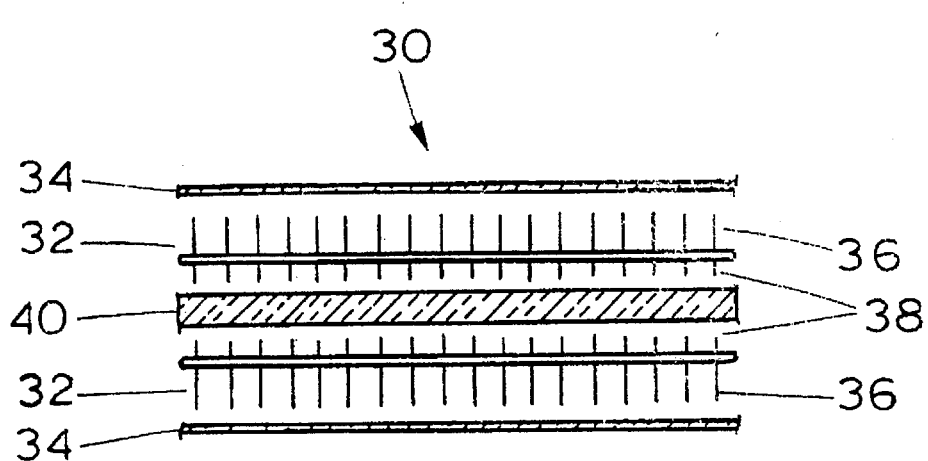

FIG. 2 shows a semi-finished material (30) according to the invention with the "long spikes (32) surface" sides oriented towards layers of thermoplastic resin (34) located on the outside of the semi-finished composite sheet made of said glass mats (36). Shorter spikes (38) on the inside oriented towards layer of thermoplastic resin (40), in combination with longer spikes on the outside have proved to greatly improve flowability of the semi-finished composite sheet made of said glass mats. Shorter spikes (38) on the inside import greatly improved composite sheet integrity during pre-heating above the melting point of the polymer matrix, in particular in circulating air ovens running at high temperatures and high air velocity. Longer spikes (32) on the outside prevent fast cooling down after placing the heated composite sheets in the mold. However, too long spikes as they were often necessary to achieve the desired integrity of single-side needled mats, should be avoided to prevent overheating of the composite sheet surface during the pre-heating process.

This arrangement with long/long outwards oriented spikes provides for improved flow moulding properties, say 10–20% lower moulding pressure requirement to fill a given mould. This can be very significant for the moulder.

Such a semi-finished product with long/long outwards oriented spikes is especially suitable for non-visible parts which require "easy flow" material to completely fill the mould due to complex geometry and/or very thin wall sections.

The number of glass fibre ends protruding from the glass mat surface, also referred to as the spikes density, can be tailored to suit different application needs. Products covering a wide range in terms of the number of spikes on both mat sides can be made within the criteria outlined in this invention, controlled by adjusting the needling conditions.

Usual values of some parameters are outlined below:

Glass mat surface weight

Typically between 200 and 1500 g/m$^2$.

Spikes length

The reference level for the measurement of spikes length is, in practice, not easily defined. However, the following data may be considered to provide a useful indication:

"long": typically 6–8 mm (average)

"short": typically 1–4 mm minimum difference 3 mm (average)

Spikes density

Again rather difficult to quantify. The spikes density is determined by the puncture density, whereby spikes "bundles" are formed, since the glass mats are made with glass fibre strands consisting of a larger number of single fibre filaments. Typical puncture density is between 20 and 40/cm$^2$ from each side (double sided needling), but up to 60/cm$^2$ is also feasible.

Glass mat properties

Glass mat tensile strength is generally used as an important characteristic to define the suitability of a glass mat for use in GMT manufacturing and processing. As a rule of thumb, the objective is a compromise between handling requirements (min. 10–15 N/100 mm) and the need for a high glass mat mobility, i.e. low mat tensile strength, during flow moulding.

Typical values for a mat weight of 600 g/m$^2$: 10–40 N/100 mm, normally 20 N/100 mm.

Suitable is for example a fibre reinforced sheet thermoplastic composite semi-finished material (GMT) comprising two mats of needled chopped glass fibre strands with the following characteristics: mat weight about 600 g/m$^2$, same spikes density on both sides, average spikes length about 1–2 mm on one side, about 6–8 mm on other side. Impregnated with polypropylene as the thermoplastic resin (1900 g/m$^2$ between the fibre-mats and 500 g/m$^2$ on each surface) to result in a thickness of the semi-finished composite sheet of 3.7 mm with a glass content of 30% by weight.

Although polypropylene is a preferred thermoplastic resin, other thermoplastic resins such as e.g. polyamides (PA), polyketones, polyethylenterephthalate (PET), polybutyleneterephthalate (PBT) as well as blends thereof and/or with polypropylene are suitable.

If the "long spikes surface" sides of the glass mats are oriented inwards a resin rich, high quality surface is obtained. Such a semi-finished sheet material is particularly suited for pre-heating in an infrared oven.

If the "long spikes surface" sides of the glass mats are oriented outwards a very good flowability is realized. Such a semi-finished sheet material is particularly suited for pre-heating in a circulating hot air oven.

Such fibre reinforced thermoplastic semi-finished sheet materials are suitable for automotive interior trim parts and semi-structural parts in various industrial applications whereby the "long spikes surface" sides oriented inwards are preferably used for application requiring high quality surface aspects and the "long spikes surface" sides oriented outwards are preferably used for complex parts or parts having very thin (<2 mm) sections.

We claim:

1. A fiber-reinforced thermoplastic composite material, comprising at least two glass mats which comprise glass fiber strands selected from the group consisting of continuous glass fiber strands and chopped glass fiber strands, and mixtures thereof, wherein each glass mat is asymmetrically needled from each of its two surfaces such that the number of fiber ends protruding from each surface is essentially the same and that fiber ends protruding from a first surface are longer than fiber ends protruding from a second, opposite surface and wherein thermoplastic resin is placed between said glass mats and along an outer surface of each of said glass mats.

2. The fiber-reinforced thermoplastic composite material according to claim 1, wherein said fiber ends protruding from said first surface of said glass mats have an average length of less than about 2 millimeters and said fiber ends protruding from said second, opposite surface of said glass mats have an average length of between about 6 millimeters and about 10 millimeters.

3. The fiber-reinforced thermoplastic composite material according to claim 1, wherein said longer fiber ends of each glass mat are oriented toward said thermoplastic resin placed between said glass mats.

4. The fiber-reinforced thermoplastic composite material according to claim 1, wherein said longer fiber ends of each glass mat are oriented away from said thermoplastic resin placed between said glass mats.

5. The fiber-reinforced thermoplastic composite material according to claim 1, wherein said glass mats have a specific surface weight of between about 200 g/m$^2$ and about 1500 g/m$^2$.

6. The fiber-reinforced thermoplastic composite material according to claim 1, wherein said thermoplastic resin is selected from the group consisting of polypropylene, polybutyleneterphthalate, and polyethyleneterphthalate.

* * * * *